J. B. DAVIS.
FITTING FOR FLEXIBLE HOSE.
APPLICATION FILED MAR. 12, 1917.
1,266,416.
Patented May 14, 1918.
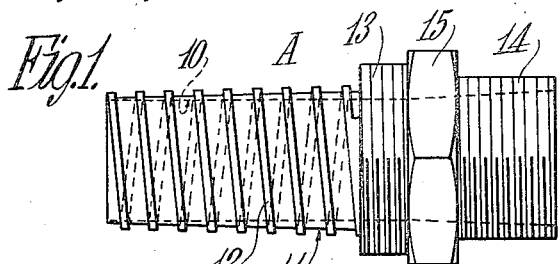
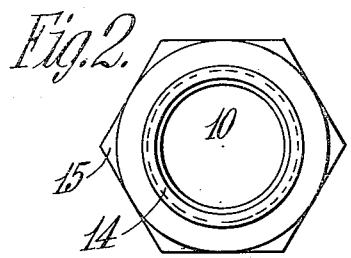
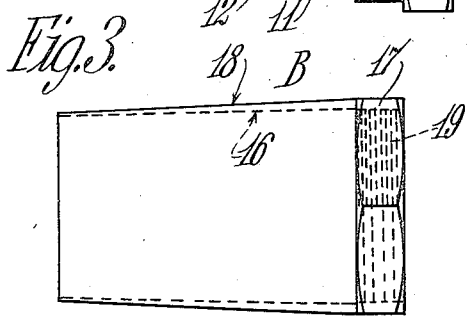
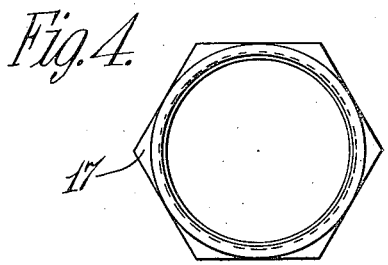
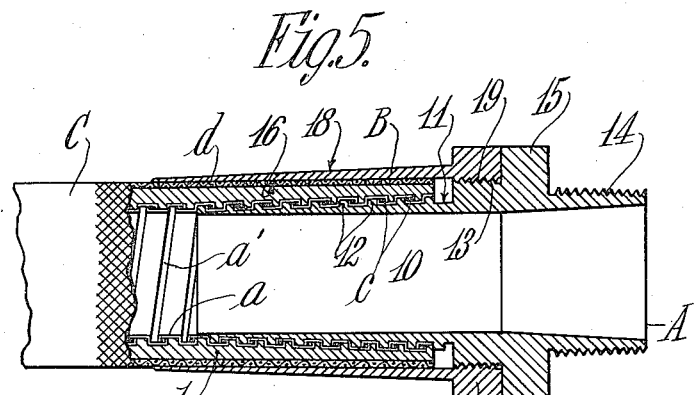
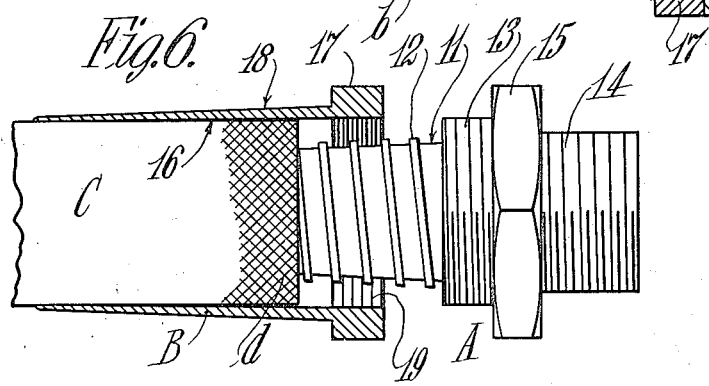
WITNESS
INVENTOR.
John B. Davis.
BY
ATTORNEYS.

UNITED STATES PATENT OFFICE.

JOHN B. DAVIS, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS.

FITTING FOR FLEXIBLE HOSE.

1,266,416.  Specification of Letters Patent.  Patented May 14, 1918.

Application filed March 12, 1917. Serial No. 154,290.

*To all whom it may concern:*

Be it known that I, JOHN B. DAVIS, a citizen of the United States of America, residing at Springfield, in the county of Hampden and State of Massachusetts, have invented certain new and useful Improvements in Fittings for Flexible Hose, of which the following is a specification.

This invention relates to terminal fittings for hose and more particularly to fittings for internally armored hose by means of which the hose may be adapted for convenient connection to various fittings and devices.

Flexible hose, internally armored, is known and largely used. One type of the armor construction includes a hose interiorly lined by a helically wound metal strip of right angle S cross section. Each coil of this strip has its side flanges lying loosely between the side and middle flanges of adjacent coils. Between the side flanges of the coils thus positioned a flexible packing is generally used. The coils can by such a construction move one relatively to another and permit the metal lined hose to bend quite freely, for the coils telescope and accommodate themselves to various bends while at all times maintaining the lining in effective position for its function.

The hose described finds one important use in conducting gasolene or other liquids, which should be kept away from the rubber and fabric of the ordinary flexible hose because of the harmful effect thereon and which liquids are too dangerous or valuable to risk in a hose that may leak readily. While the internally armored hose is very useful for the reasons stated, such hose has been a source of excessive trouble and expense because of the problems in effectively fastening hose fittings thereon and connecting the hose to valves, pipes, and the like.

This invention makes use of the internal armor in accomplishing its purpose of providing an effective fitting for the hose. It, therefore, combines with that element of the hose (the armor), which heretofore has caused the trouble, and without in the least affecting its former function makes it perform an additional function in combination with the hose fitting.

Briefly stated, the fitting consists of an externally threaded nipple, the threads of which combine with a loosely wound female metal thread lining snugly fitting the hose, at least at the portion joined. Preferably, the nipple is so constructed that, when it is turned into the spirally wound lining, it acts upon the threads or metal coils of the lining with a tendency to elongate the latter and thus to produce a variation in the pitch of the convolutions, in this instance an increase in the pitch. The variation in the pitch of the metal coils engaged produces a distortion of the lining, with the result that the nipple is joined to the hose by a binding action of the lining thereon. The gist of the invention lies in obtaining a binding action of the lining on the nipple by constructing the latter to produce, or tend to produce, a variation in the pitch of the convolutions of the lining.

While the invention is described in connection with an internally armored hose, such as described, it may be embodied in a hose of other construction by providing with the hose an element equivalent to that found in the type of hose mentioned specifically for coöperation with the nipple in the same way.

The invention, in a specific embodiment at present preferred, is shown for illustrative purposes in the accompanying drawings, in which—

Figures 1 and 2 are side and end elevational views, respectively, of the nozzle element of the terminal fitting;

Figs. 3 and 4 are side and end elevational views, respectively, of the ferrule element of the fitting;

Fig. 5 is a sectional elevation showing the terminal fitting applied to a hose; and Fig. 6 is an elevational view, with parts in section, showing one step in the operation of applying the fitting to a hose.

Referring to these drawings, the terminal fitting preferably comprises two parts, a nozzle or nipple element A and a ferrule element B, shown respectively in Figs. 1 and 3, which are adapted to be applied interiorly and exteriorly, respectively, to the hose and to be thereafter coupled together.

Referring to Figs. 1 and 2, the nozzle element A has a cylindrical opening 10 therethrough, which opening is substantially equal in diameter to the internal diameter of the hose with which it is used. One end of the element A is relatively long and is preferably of frusto conical shape, having a tapered surface 11 which is provided with a helical thread 12 of rectangular cross sectional shape. Adjacent the large end of surface 11 is a threaded portion 13 which, as will appear, is adapted to receive a part of the ferrule element B. The other end of the nozzle element A is provided with a screw threaded portion 14 which is adapted to receive any kind of a fitting which it is desired to attach to the end of a hose, such as, a union, faucet, or the like. Between the threaded portions 13 and 14, a nut 15, shown as hexagonal in shape, is formed by means of which the nozzle element may be turned in a manner to be described.

Referring to Figs. 3 and 4, the ferrule B is of hollow frusto conical form and has an interiorly tapered surface 16. Adjacent the large end of member B, a suitable nut 17 is formed which in the present embodiment is of the same shape and size as nut 15. Preferably the exterior surface 18 of ferrule B is tapered slightly from nut 17 toward the small end of the ferrule. The surface 16 terminates at its larger end with an interiorly threaded portion 19 which is adapted to screw onto the threaded portion 13 of the nipple element A.

The members A and B are adapted particularly for use with flexible metallic lined hose as mentioned above for a terminal fitting to adapt the end of the hose to receive any of the usual screw threaded fittings. Flexible metallic lined hose is, of course, well known in the art, and one common type of such hose has been shown in Fig. 5 to illustrate the use of the fitting. The hose C illustrated comprises a spirally wound metallic strip *a* of substantially the cross sectional shape shown in Fig. 5. Each edge of the strip *a* is flanged in the well known way so that successive convolutions interlock one with another in the manner indicated in Fig. 5. The usual packing strip, placed between adjacent flanges of strip *a*, is indicated by reference *c*. About the exterior of the spirally wound strip *a*, a layer *b* of rubber or like material is applied, and the layer *b* is generally provided with an outer braided covering *d* of suitable fabric. It is to be noted that on the interior of the hose helical grooves *a'* are formed by the spirally wound strip *a*, and it is with grooves *a'* that the helical thread 12 is adapted to engage.

In applying members A and B to hose C, the ferrule B is first slipped over the exterior surface of the end of hose C, small end foremost, into substantially the position shown in Fig. 6. The nipple element A is next applied to the interior of hose C by screwing the thread 12 into the helical groove *a'* of lining *a*, and it is to be noted that since the thread 12 is of rectangular cross sectional shape a firm coöperative engagement of element A with the lining *a* is obtained to effectually draw the former into the hose. The nipple member is screwed into the hose as far as possible by hand and will then occupy substantially the position shown in Fig. 6. The ferrule B is then moved axially on hose C until the portion 19 can be screwed upon the threaded portion 13 of the nipple member. The two members A and B are thus coupled together and are thereafter moved together, a suitable wrench being applied to nuts 15 and 17, while the hose is held in a vise, if necessary, to turn the members until the nipple A has been screwed into the hose C as far as possible. In the event that thread 12 cannot be entirely screwed into the hose, the ferrule B covers and conceals that portion of surface 11 of the nipple which does not enter the hose.

Although the fitting, in the embodiment herein disclosed, employs a ferrule element, the use of the latter is not essential although in many instances it is preferred. The important and beneficial results of the invention are obtained primarily by the coöperative engagement of the threaded nipple with the flexible internal armor of the hose in a manner to be described.

The armor strip *a* is flexible and successive convolutions thereof are capable of relative movement to permit bending of the hose. The female thread *a'* formed between the end flange of one convolution of strip *a* and the middle flange of the adjacent convolution is, therefore, not a rigid thread of the ordinary type. On the contrary successive convolutions may telescope upon one another and are at all times free for a certain latitude of relative movement. The thread *a'* formed by the loosely wound spiral strip is engaged by the thread 12 and, as the nipple A is turned, it is drawn into the end of the hose. The operation of drawing the nipple into the hose is necessarily accomplished only by overcoming a certain frictional resistance. That is, one face of the thread 12 bears with pressure on one flange of the strip *a* to draw the nipple into the hose and thus tends to displace the latter in an axial direction. The strip being loosely wound is readily displaced when the nipple A is turned with the result that there is a tendency to elongate the spirally wound strip and thus increase the pitch of successive convolutions thereof. The distortion of the thread *a* by reason of the displacement of successive convolutions of the lining results in a binding action tending to resist displacement of the nipple.

The binding action described may be increased by utilizing the tapered nipple as illustrated. Thus, as the thread 12 is screwed into the loosely wound thread $a'$, it is acted upon as before and the binding action occurs in a like manner, but it is accentuated by the direct expansive action of the tapered surface 11 on the interior of the strip $a$. The layer $b$ of rubber or the like and fabric covering $d$ is thus forced against the interiorly tapered surface 16 of ferrule B. The part $b$ of the hose is compressed against the surface 16, and the taper of surface 16 is of less degree than that of surface 11 with the result that part $b$ is compressed to the greatest degree at the end of hose C. This results in making a tight or leakless joint between the members A, B, and C. If desired, the screw thread connection 13, 19 may be leaded in the usual manner to still further insure against leakage, or shellac or the like may be poured into the space between nozzle element A and ferrule B just prior to the coupling of these elements. It will be seen from Fig. 1 that the thread element extends entirely to the small end of surface 11, and this is desirable where, as here, it is desired to have the opening 10 equal, or substantially so, to the internal diameter of the hose C.

The result of the use of the nipple alone or of the latter with the ferrule is to distort the strip and, when distorted, the strip $a$ tends to resume its normal undistorted position and thereby clings to the element A with a spring action. Thus, the nipple A is prevented from working loose from the hose C. The extent of the spring action of the distorted strip $a$ upon the member A is such as to render most difficult any movement of the latter in either direction after the parts have once been assembled. For example, it has been found in practice that, in order to remove the members A and B from hose C, the latter must be first cut off close to ferrule C and then the strip $a$ is pulled from the hose, after which the parts A and B may be unscrewed.

The invention has been described in a preferred form for the purposes of illustration, but the scope of the invention is defined by the appended claims rather than by the foregoing description.

What I claim is:

1. A connection for internally metallic lined hose, comprising, an externally threaded nipple constructed and arranged to engage with the female thread of the loosely wound metallic lining of the hose to produce a distortion of the lining so that the nipple may be held to the hose by a binding action of the lining thereon.

2. A connection for internally metallic lined hose, comprising, an externally threaded nipple having an opening therethrough substantially equal to that of the hose, the thread on the nipple extending entirely to one end thereof and arranged to screw into the loosely wound female thread formed by the convolutions of the lining and produce a distortion of the latter, whereby the nipple may be held to the hose by the binding action of the lining thereon.

3. A connection for internally metallic armored hose, comprising, a nipple having a thread on one end adapted to receive a suitable fitting, and a tapered portion at the other end having a male thread formed thereon, said thread being constructed and arranged to screw into the female thread formed by the convolutions of the armor and produce by varying the pitch of the convolutions and by expansion thereof, a distortion of the armor to hold the nipple thereto by a binding action.

4. A connection for internally metallic armored hose, comprising a nipple having a thread on one end adapted to receive a suitable fitting, and a tapered portion at the other end having a male thread formed thereon, said thread being constructed and arranged to screw into the female thread formed by the convolutions of the armor and to produce by varying the pitch of the convolutions and by expansion thereof, a distortion of the armor to hold the nipple thereto by a binding action, and a ferrule element adapted to slip over the exterior of the hose and against which the hose may be compressed by the distortion of said lining.

5. In a connection for internally metallic lined hose, a hollow exteriorly tapered nipple, a thread formed on the exteriorly tapered surface extending entirely to the small end thereof and arranged to engage in the interior spiral groove in said lining, and a ferrule member having an interiorly tapered surface and being constructed to slip, small end foremost, over the exterior of the hose and to be coupled to said nipple, the latter being constructed to screw interiorly into the lining to distort and expand the latter and force the outer part of the hose against said surface, all constructed and arranged so that the lining engages the element with a spring action to resist relative movement of the nipple and the lining.

6. In combination with a hose, a flexible loosely wound spiral lining of metal therefor, successive convolutions of the lining being arranged to interlock and form therebetween a female thread, and an externally threaded nipple, arranged to screw into the female thread and to vary the pitch of successive convolutions of the lining so that the latter is distorted, whereby the nipple may be held to the hose by a binding action exerted by the lining thereupon.

7. In combination with a hose, a flexible spirally wound metallic internal lining therefor, successive convolutions of the lining being arranged to interlock for relative movement and to form a loosely wound female thread, and an externally threaded tapered nipple constructed and arranged to screw into the end of the hose and engage said female thread in the lining, the convolutions of said female thread arranged to be varied in pitch by the nipple and bulged outwardly thereby, whereby the lining exerts a spring action on the nipple and an expansive action on the hose to bind the two together.

JOHN B. DAVIS.